(12) United States Patent
Hicks

(10) Patent No.: US 8,917,902 B2
(45) Date of Patent: Dec. 23, 2014

(54) IMAGE OVERLAYING AND COMPARISON FOR INVENTORY DISPLAY AUDITING

(75) Inventor: Michael A. Hicks, Clearwater, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 503 days.

(21) Appl. No.: 13/217,031

(22) Filed: Aug. 24, 2011

(65) Prior Publication Data
US 2013/0051611 A1    Feb. 28, 2013

(51) Int. Cl.
G06K 9/32       (2006.01)
G06K 9/62       (2006.01)
G06Q 10/08      (2012.01)

(52) U.S. Cl.
CPC .................................. *G06Q 10/0875* (2013.01)
USPC ............................ 382/100; 382/218; 382/294

(58) Field of Classification Search
None
See application file for complete search history.

(56) References Cited

U.S. PATENT DOCUMENTS

| | | | |
|---|---|---|---|
| 4,272,580 A * | 6/1981 | de Zepeda-Bermudez | ... 428/153 |
| 5,893,076 A | 4/1999 | Hafner et al. | |
| 6,205,431 B1 | 3/2001 | Willemain et al. | |
| 6,561,417 B1 | 5/2003 | Gadd | |
| 6,590,997 B2 | 7/2003 | Rhoads | |
| 7,080,778 B1 | 7/2006 | Kressin et al. | |
| 7,092,929 B1 | 8/2006 | Dvorak et al. | |
| 7,168,618 B2 | 1/2007 | Schwartz | |
| 7,222,786 B2 | 5/2007 | Renz et al. | |
| 7,422,244 B1 | 9/2008 | Redmond et al. | |
| 7,516,128 B2 | 4/2009 | Colby et al. | |
| 7,584,016 B2 | 9/2009 | Weaver | |
| 8,009,864 B2 | 8/2011 | Linaker et al. | |
| 8,423,949 B2 * | 4/2013 | Furumoto | ..................... 716/139 |
| 8,559,766 B2 * | 10/2013 | Tilt et al. | ....................... 382/312 |
| 2004/0258274 A1 | 12/2004 | Brundage et al. | |
| 2006/0116927 A1 | 6/2006 | Miller, III et al. | |
| 2008/0001753 A1 | 1/2008 | Claudatos et al. | |
| 2008/0140478 A1 | 6/2008 | Goldberg et al. | |
| 2008/0170755 A1 | 7/2008 | Nasser et al. | |
| 2008/0198001 A1 * | 8/2008 | Sarma et al. | ............... 340/539.1 |

(Continued)

FOREIGN PATENT DOCUMENTS

JP        2001088912        4/2001

OTHER PUBLICATIONS

"3D Camera—Create 3D Photos with iPhone and iPod touch," http://www.helpline3d.com/industry-updates/1331-3d-camera-create-3d-photos-iphone-ipod-touch, accessed on Jul. 24, 2011 (2 pages).

(Continued)

*Primary Examiner* — Brian P Werner
(74) *Attorney, Agent, or Firm* — Hanley, Flight & Zimmerman, LLC

(57) ABSTRACT

Image overlaying and comparison for inventory display auditing is disclosed herein. An example method to perform inventory display auditing disclosed herein comprises overlaying a reference image over a current image displayed on a camera display, the reference image corresponding to an inventory display to be audited, comparing the reference image and the current image to determine whether the current image and the reference image correspond to a same scene and when the reference image and the current image are determined to correspond to the same scene, indicating a difference region in the current image displayed on the camera display, the difference region being a first region of the current image that differs from a corresponding first region of the reference image.

20 Claims, 9 Drawing Sheets

(56) References Cited

U.S. PATENT DOCUMENTS

| | | | |
|---|---|---|---|
| 2009/0059270 A1* | 3/2009 | Opalach et al. | 358/1.15 |
| 2009/0121017 A1 | 5/2009 | Cato et al. | |
| 2009/0192921 A1 | 7/2009 | Hicks | |
| 2009/0204512 A1 | 8/2009 | Connell, II et al. | |
| 2009/0257620 A1 | 10/2009 | Hicks | |
| 2010/0138281 A1 | 6/2010 | Zhang et al. | |
| 2010/0171826 A1 | 7/2010 | Hamilton et al. | |
| 2010/0262460 A1 | 10/2010 | Brown et al. | |

OTHER PUBLICATIONS

Goldstein, Mark, "3D Photos for iPhone and iPod Touch," PhotographyBLOG, http://www.photographyblog.com/news/3d_photos_for_iphone_and_ipod_touch/, accessed on Jul. 24, 2011 (3 pages).

Primdahl, Keith et. al, "Change Detection From Multiple Camera Images Extended to Non-Stationary Cameras," in Proceedings of Field and Service Robotics 2005 (FSR05) (online version, 10 pages).

Murdoch, Peter L., "Sentry Technology Signs LOI With Orions Digital," Sentry Technology Corporation, Yahoo! Finance, http://finance.yahoo.com/news/Sentry-Technology-Signs-LOI-iw-2384033886.html?x=0&, Ronkonkoma, NY, on Mar. 25, 2011 (2 pages).

Chan, Christine, "See How You've Changed Over Time in a Time Lapse With Everyday," http://appadvice.com/appnn/2011/03/quickadvice-everyday, Mar. 25, 2011 (11 pages).

International Searching Authority, "International Search Report and Written Opinion", issued in connection with corresponding international application No. PCT/US2012/051580, mailed on Mar. 11, 2013 (10 pages).

* cited by examiner

IMAGE OVERLAYING AND COMPARISON FOR INVENTORY DISPLAY AUDITING

FIELD OF THE DISCLOSURE

This disclosure relates generally to inventory display auditing and, more particularly, to image overlaying and comparison for inventory display auditing.

BACKGROUND

Inventory display auditing involves, among other things, auditing the display of items on shelves at selected stores, such as grocery and/or other retail or wholesale stores, museums, etc. For example, inventory display auditing can involve auditors visiting selected stores to audit the causal displays of goods in the stores. Causal displays include, for example, special promotional displays of goods, manufacturer supplied displays of goods, etc., and/or any other arrangement and display of items separate from the store shelving providing the customary/usual display of a store's inventory. For example, causal displays can correspond to a short-term display of goods located at a shelf end-cap or at a free-standing display stand, whereas the customary/usual displays of inventory can correspond to the displays of goods on the long shelving aisles of a grocery or other retail store. Existing inventory display auditing techniques often involve having an auditor visit the same store repeatedly on a scheduled basis (such as a weekly basis, bi-weekly basis, monthly basis, etc.) to manually record the types of items displayed by the causal display(s).

DETAILED DESCRIPTION

Figure 1:
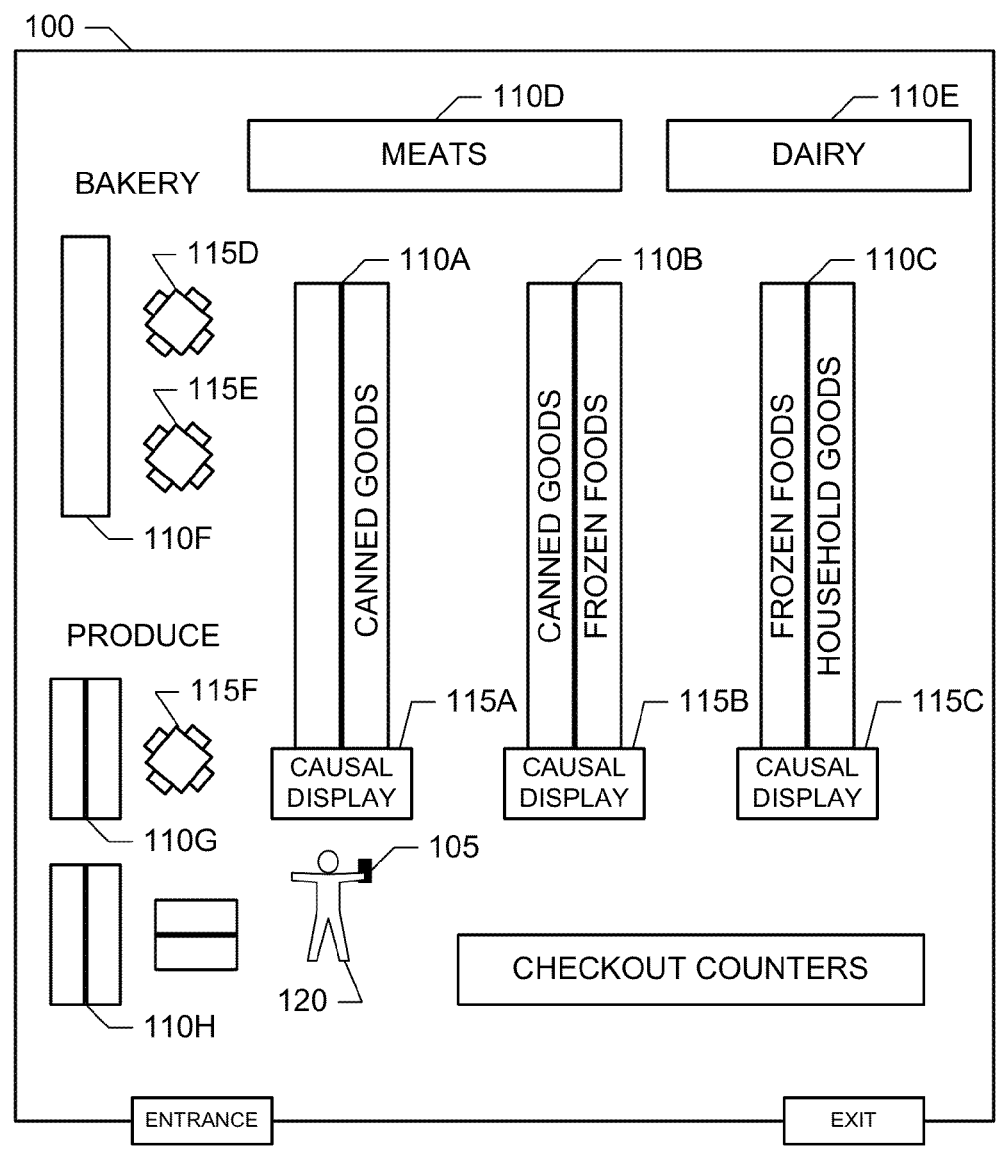
FIG. 1 is block diagram of an example environment of use for an example auditing device capable of performing image overlaying and comparison for inventory display auditing as disclosed herein.

Methods, apparatus and articles of manufacture to perform image overlaying and comparison for inventory display auditing are disclosed herein. An example method to perform inventory display auditing disclosed herein involves the use of a computing device that includes a camera and a camera display to automate the auditing process. An example of such a method includes overlaying a reference image on a current image displayed on the camera display, where the reference image is selected to correspond to an inventory display (e.g., a causal display of retail items) to be audited. In some examples, the reference image corresponds to an image of the inventory display obtained during a prior audit. To overlay the reference image over the current image, the method can, for example, combine a semi-transparent, or ghost, version of the reference image with the current image to determine a combined image, and then display the combined image on the camera display. The example method also includes comparing (e.g., via image correlation and/or other comparison techniques) the reference image and the current image to determine whether the current image and the reference image correspond to a same scene (e.g., containing the same inventory display). In some examples, when the reference image and the current image are determined to correspond to the same scene, the method further includes indicating one or more difference regions in the current image displayed on the camera display, where a difference region corresponds to a particular region of the current image that differs from a corresponding region of the reference image (e.g., based on variations exceeding a threshold, a tolerance, etc.). For example, to indicate a difference region in the current image displayed on the camera display, the method can modify an image characteristic of the corresponding region of the current image to determine a modified current image, and then display the modified current image on the camera display.

Additionally or alternatively, in some examples the method includes tracking the difference region in subsequent captured images obtained from the camera. In some examples, when the reference image and the current image captured by the camera are determined to correspond to the same scene, the method additionally or alternatively includes determining a directional difference between the current image and the reference image. For example, a directional difference can be determined by correlating the current image with shifted versions of the reference image, and/or vice versa, to determine a shift that increases (e.g., maximizes) the correlation between the current image and the reference image. This shift can then be translated to a positional movement of the camera. In some examples, the method further includes presenting a directional prompt on the camera display that indicates a direction in which to move the camera to increase a likelihood that a subsequent captured image and the reference image will be determined to correspond to the same scene.

An example apparatus, such as a portable computing device, to perform inventory display auditing disclosed herein includes an example camera and an example camera display to display a sequence of captured images obtained by the camera. The example apparatus also includes an example positioner to overlay a semi-transparent, or ghost, version of a reference image over the sequence of captured images as the sequence of captured images are displayed on the camera display. The reference image is selected to correspond to an inventory display (e.g., causal display of retail items) to be audited. When a captured image in the sequence of captured images is determined to correspond to a same scene (e.g., containing the same inventory display) as the reference image, the example positioner is also to automatically select the captured image to represent a current version of the inventory display to be audited. In some examples, when the captured image in the sequence of captured images is determined to not correspond to the same scene as the reference image, the example positioner is to determine a directional difference between the captured image and the reference image, and then present a directional prompt on the camera display. The directional prompt is to indicate a direction in which to move the apparatus to increase a likelihood that a subsequent captured image and the reference image will be determined to correspond to the same scene as the reference image.

In some examples, the apparatus further includes an example comparator to compare the reference image and a representative captured image of the inventory display to determine a difference region between the captured image and the reference image. The example comparator is also to indicate the difference region in the representative captured image while the representative captured image is presented on the camera display. In some examples, the apparatus additionally includes an example tracker to track the difference region in presentations on the camera display of subsequent captured images following the representative captured image in the sequence of captured images. For example, the tracker can cause the difference region displayed on the camera display to move such that is still covers the appropriate region of the inventory display as the viewpoint of the camera changes.

As noted above, existing inventory display auditing techniques (also referred to as store display auditing, in-store display auditing, retail display auditing, etc.) can involve having an auditor visit the same store repeatedly on a scheduled basis to manually record the types of items displayed by the causal display(s) in the store. However, causal displays may remain unchanged for several weeks or months. Thus, such existing manual techniques can be inefficient and duplicative, especially considering that causal displays may remain the same over several auditor visits. Unlike these existing inventory display auditing techniques, example methods, apparatus and articles of manufacture disclosed herein capture image(s) or video of an inventory display, such as a causal display, and utilize image comparison (such as correlation in real-time) with a reference image from an initial audit to automatically indicate to an auditor whether the display is unchanged and, thus, a subsequent audit can be skipped. Examples provided herein may provide visual aid(s) to assist the auditor in obtaining a captured image of the current inventory display being audited that aligns or otherwise coincides with the reference image obtained from the initial audit. Additionally, if the inventory display being audited has changed since the initial audit, example methods, apparatus and articles of manufacture disclosed herein can indicate in the captured image(s) (e.g., via highlighting, annotation, etc.) the portion(s) of the inventory display that have changed, thereby enabling the auditor to focus her audit on the appropriate region(s) of the inventory display.

Turning to the figures, FIG. 1 illustrates a block diagram of an example environment of use 100 for an example auditing device 105 capable of performing image overlaying and comparison for inventory display auditing as disclosed herein. In the illustrated example, the environment of use 100 corresponds to an example grocery store 100. However, the environment of use 100 could additionally or alternatively correspond to any type of retail establishment (e.g., a department store, a clothing store, a specialty store, a hardware store, etc.) and/or other environment in which auditing of displayed items is to be performed.

The example grocery store 100 of FIG. 1 includes multiple inventory displays 110A-H and 115A-F. In the illustrated example, the inventory displays 110A-H correspond to the customary/usual displays of the store's inventory. For example, the inventory displays 110A-C represent the long shelving aisles of the grocery store 100 that correspond to the typical locations for displaying canned goods, frozen goods, household goods, etc., that are for sale. The inventory displays 110D-E represent the display cases and shelving corresponding to the typical locations for displaying meat and dairy products for sale. The inventory displays 110D-E represent the display cases and shelving corresponding to the typical locations for displaying bakery goods and fresh produce for sale.

The example grocery store 100 of FIG. 1 also includes the inventory displays 115A-F that represent the causal displays 115A-F located in the grocery store 100. As noted above, the causal displays 115A-F include, for example, special promotional displays of goods, manufacturer supplied displays of goods, etc., and/or any other arrangement and display of items separate from the inventory displays 110A-H providing the customary/usual display of a store's inventory. For example, the causal displays 115A-F in the example grocery store 100 include the causal displays 115A-C located at the end-caps of the inventory displays 110A-C, and the freestanding causal displays 115D-F located in the bakery and produce sections of the grocery store 100.

In the illustrated example of FIG. 1, an example auditor 120 visits the grocery store 100 on a scheduled basis (such as a weekly basis, bi-weekly basis, monthly basis, etc.) to audit the causal displays 115A-F in the grocery store 100. In some examples, the auditor 120 could also audit the inventory displays 110A-H corresponding to the customary/usual display of a store's inventory, but that task is often the responsibility of store personnel instead of the auditor 120. The audit performed by the auditor 120 generally includes recording the types and/or locations of items displayed by the causal display(s) 115A-F. The audit may also include identifying which causal display(s) 115A-F have changed since the last audit performed by the auditor 120, thereby enabling the audit to indicate which of the causal display(s) 115A-F are new and which of the causal display(s) 115A-F are pre-existing. For the pre-existing display(s) 115A-F, the audit can also be used to determine duration of these displays. To facilitate automation of the auditing process, the auditor 120 employs the auditing device 105, which is capable of performing image overlaying and comparison for inventory display auditing in accordance with the examples disclosed herein.

Figure 2:
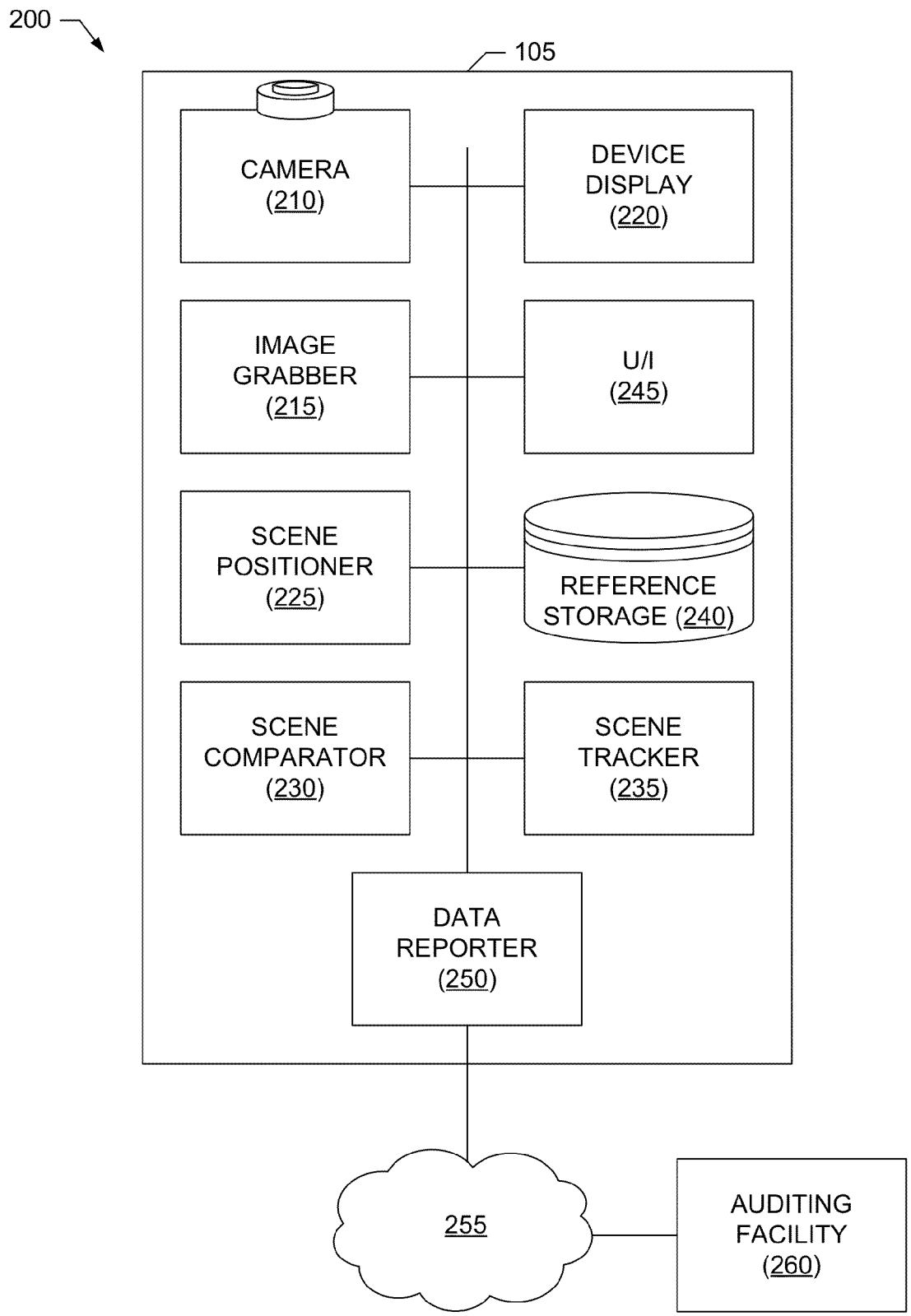
FIG. 2 is a block diagram of an example auditing device that may be used in the example environment of FIG. 1.

A block diagram of an example auditing system 200 based on the example auditing device 105 of FIG. 1 is illustrated in FIG. 2. FIG. 2 also illustrates an example implementation of the auditing device 105. The example auditing device 105 of FIG. 2 can be implemented by a general-purpose computing device, such as a tablet computer, a laptop computer, a smartphone, a personal digital assistance (PDA), etc., or a special-purpose computing device. In the illustrated example of FIG. 2, the auditing device 105 includes an example camera 210 that can be implemented by any type of camera or other image capturing device. The camera 210 can integrated into the auditing device 105 (e.g., such as a built-in camera of a tablet computer, a laptop computer, a smartphone, a PDA, etc.) or separate from, but communicatively coupled to, the auditing device 105 (e.g., via a universal serial bus (USB) or other cabled connection, a wireless connection, etc.).

The example auditing device 105 of FIG. 2 also includes an example image grabber 215 to capture images rendered by the camera 210. The image grabber 215 produces a sequence of digital images, which can be at a frame rate corresponding to full-motion video and/or at one or more lower or higher frame rates. The digital images produced by the image grabber 215 can be color images, grayscale images, etc. In some examples, the functionality of the image grabber 215 is integrated in the camera 210.

The example auditing device 105 of FIG. 2 further includes an example device display 220 to implement a camera display that displays images obtained from the camera 210 (e.g., via the image grabber 215). The device display 220 may be implemented by any type of imaging display using any type of display technology, such as a liquid crystal display (LCD), a light emitting diode (LED) display, a plasma display, a cathode ray tube (CRT) display, etc., and/or one or more of the output devices 1128 included in the example processing system 1100 of FIG. 11, which is described in greater detail below. The device display 220 can be integrated into the auditing device 105 (e.g., such as a built-in display of a tablet computer, a laptop computer, a smartphone, a PDA, etc.) or separate from, but communicatively coupled to, the auditing device 105 (e.g., via a cabled connection, a wireless connection, etc.). In some examples, the device display 220 can be implemented via augmented reality glasses combined with, for example, a handheld input device to implement the remainder of the auditing device 105 (e.g., such that the handheld input device is used to initiate image captures, change modes, etc.).

To implement image overlaying and comparison for inventory display auditing in accordance with the examples disclosed herein, the example auditing device 105 of FIG. 2 includes an example scene positioner 225, an example scene comparator 230 and an example scene tracker 235. The scene positioner 225 of the illustrated example performs positioning-related processing to assist the auditor 120 in positioning the auditing device 105 or, more specifically, the camera 210 in an orientation relative to an inventory display being audited (e.g., such as the inventory display 115A) such that the image(s) captured by the camera 210 (e.g., via the image grabber 215) during a current audit are comparable with a reference image taken during a prior (e.g., initial) audit of the store 100. In some examples, the auditor 120 can select a particular reference image obtained during a prior (e.g., initial) audit of an inventory display being audited (e.g., such as the inventory display 115A) from an example reference storage 240 included in the example auditing device 105 of FIG. 2. In the illustrated example, the reference storage 240 stores reference images corresponding to one or more inventory displays (e.g., such as the inventory displays 115A-F and/or the inventory displays 110A-H). For example, the auditor 120 can use an example user interface 245 included in the example auditing device 105 of FIG. 2 to select a particular reference image from the reference storage 240. The references images stored in the reference storage 240 can be downloaded to the reference storage 240 via a wireless connection (e.g., a mobile cellular network connection, a WiFi network connection, etc.), a cabled connection (e.g., USB, Ethernet, etc.), a detachable memory device (e.g., a USB memory stick, etc.), etc. The reference storage 240 can be implemented by any type of memory or storage device, such as one or more of the mass storage device 1130 and/or the volatile memory 1118 included in the example processing system 1100 of FIG. 11, which is described in greater detail below. The user interface 245 can be implemented by any type of the user interface, such as a touchscreen, touchpad, keypad, keyboard, etc., and/or any one or more of the input device 1126 included in the example processing system 1100 of FIG. 11, which is described in greater detail below.

Figure 4:
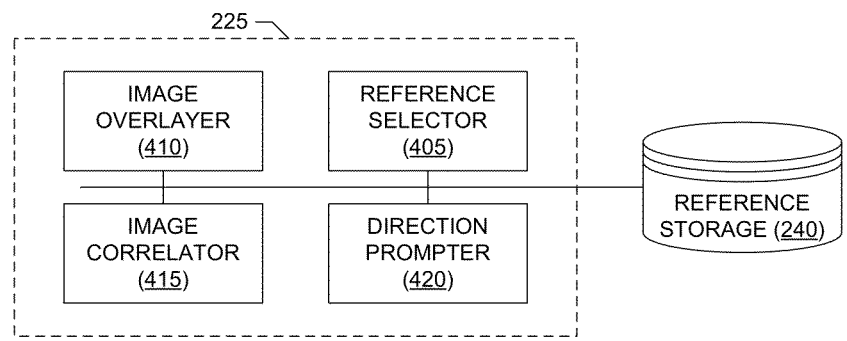
FIG. 4 is a block diagram of an example scene positioner that may be used to implement the example auditing device of FIG. 2.

Because positioning that relies solely on the accuracy of the human auditor 120 can be prone to error and fatigue, the scene positioner 225 is included in the example auditing device 105 to provide cues (e.g., visual and/or audible) to the auditor 120 to aid in accurately positioning the auditing device 105 or, more specifically, the camera 210. Assuming without loss of generality that the inventory display 115A is being audited, the scene positioner 225 can cause a semi-transparent version (e.g., ghost version) of a reference image corresponding to the inventory display 115A (e.g., as selected by the auditor 120) to be overlaid on a current captured image from the camera 210 that is being displayed on the device display 220. The auditor 120 can then change the orientation of the auditing device 105 or, more specifically, the camera 210 until a captured image of the inventory display 115A obtained by the camera 210 coincides with or otherwise matches (e.g., within some subjective or objective tolerance) the semi-transparent version of reference image corresponding to the inventory display 115A. In some examples, the scene positioner 225 performs real-time comparison (e.g., correlation) of the reference image with the current captured image obtained from the camera (e.g., also referred to as the current camera view) to determine and provide one or more cues (e.g., visual cues such as arrows, audible cues such as directions to move left or right, etc.) to guide the positioning of the auditing device 105 or, more specifically, the camera 210 by the auditor 120. Furthermore, to reduce the likelihood of human error, the scene positioner 225 in some examples can automatically trigger selection of a current captured image obtained from the camera 210 (e.g., via the image grabber 215) to represent the inventory display 115A when the comparison (e.g., correlation) between the reference image with the current captured image indicates that the reference image and the current captured image correspond to a same scene (e.g., a scene containing the inventory display 115A). An example implementation of the scene positioner 225 is illustrated in FIG. 4, which is described in greater detail below.

The scene comparator 230 included in the example auditing device 105 of FIG. 2 performs comparison-related processing to compare the captured image(s) determined by the scene positioner 225 to be representative of the inventory display 115A with the reference image selected as corresponding to the inventory display 115A to identify the difference(s), if any, between the captured image(s) and the reference image. In some examples, the scene comparator 230 performs foreground identification, image segmentation in the image foreground, and then identification of differences between the segmented foregrounds of the captured and reference images. Generally, the inventory display being audited (e.g., the inventory display 115A) will correspond to the foreground of the captured and reference images. Focusing processing on the foreground portions of the images can improve comparison accuracy by disregarding unimportant differences in the background portions of these images. In some examples, the scene comparator 230 obtains successive captured images from the camera 210 (e.g., via the image grabber 215) that represent the inventory display being audited (e.g., the inventory display 115A) and identifies the foreground of the captured image(s) by examining the parallax in the captured image(s) over time.

Figure 5:
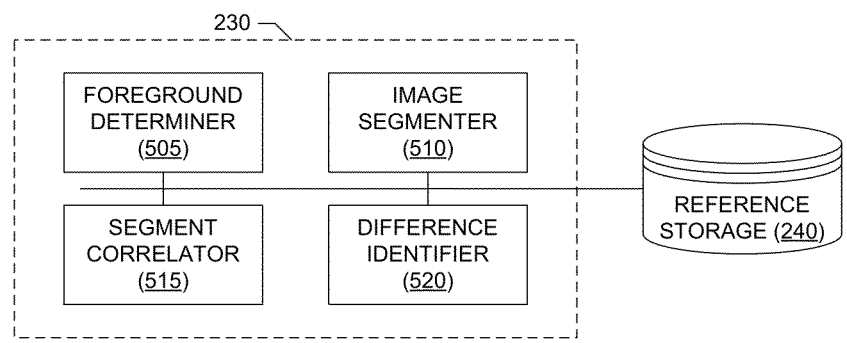
FIG. 5 is a block diagram of an example scene comparator that may be used to implement the example auditing device of FIG. 2.

In some examples, the scene comparator 230 performs image segmentation on a captured image (or the foreground portion(s) of a captured image) representing the inventory display being audited (e.g., the inventory display 115A) to, for example, identify item boundaries for items displayed on the inventory display being audited. Segmented regions located in the same or similar portions of the captured and reference images (e.g., the identified foreground portions) can then be compared (e.g., via correlation) to identify the segmented region(s), if any, for which the captured and reference images differ. The scene comparator 230 can then indicate these difference regions(s) in the captured image as displayed on the device display 220 (e.g., via highlighting, annotation, etc., or any modification of one or more image characteristics) to enable the auditor 120 to focus the audit on the portions of the inventory display that have changed since the initial audit corresponding to the reference image. An example implementation of the scene comparator 230 is illustrated in FIG. 5, which is described in greater detail below.

Figure 6:
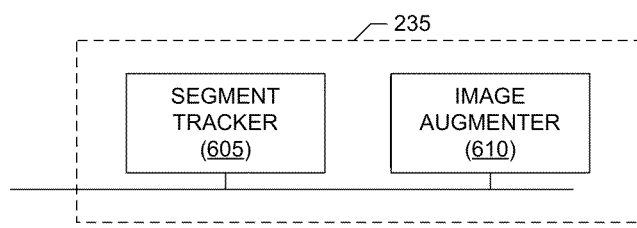
FIG. 6 is a block diagram of an example scene tracker that may be used to implement the example auditing device of FIG. 2.

The scene tracker 235 included in the example auditing device 105 of FIG. 2 performs tracking-related processing to enable the auditing device 105 to, for example, display an augmented reality version of an inventory display as it is being audited. For example, the difference regions(s) identified by the scene comparator 230 as corresponding to difference(s) between a captured image representing the inventory display being audited (e.g., the inventory display 115A) and the reference image for this inventory display can be overlaid (e.g., via highlighting, annotation, etc.) in the device display 220 of the auditing device 105. The scene tracker 235 can then use real-time comparison (e.g., real-time correlation) and/or other image tracking techniques to track the identified difference region(s) in subsequent captured images obtained from the camera 210 and displayed in the device display 220 as the auditing device 105 is moved during the auditing process. An example implementation of the scene tracker 235 is illustrated in FIG. 6, which is described in greater detail below.

The example auditing device 105 of FIG. 2 also includes an example data reporter 250 to report the captured image(s) determined by the auditing device 105 to be representative of the inventory display(s) being audited. In some examples, the auditing device 105 of FIG. 2 also allows the auditor 120 to enter auditing data corresponding to the difference region(s) identified in these captured image(s). The auditing data can specify, for example, the type(s) of items included in the difference region(s), the orientation(s) of the items included in the difference region(s), etc. If no difference regions are identified in a captured image representing an inventory display being audited, the data reporter 250 can report that auditing of this inventory display can be skipped (e.g., because the captured image indicates that the state of the inventory display is unchanged since the corresponding reference image was taken). The data reporter 250 can store and report its auditing data using any type of data and/or messaging format.

In the illustrated example, the data reporter 250 reports the auditing data via an example network 255 to an example auditing facility 260. The auditing facility 260 can correspond to any facility, processor, server, etc., capable of receiving and post-processing the auditing data reported by the data reporter 250. The network 255 can be implemented by any type and/or number of communication networks, such as one or more of the Internet, a local area network (LAN), a wide area network (WAN), a wireless network, a mobile telephony network, etc.

Figure 3:
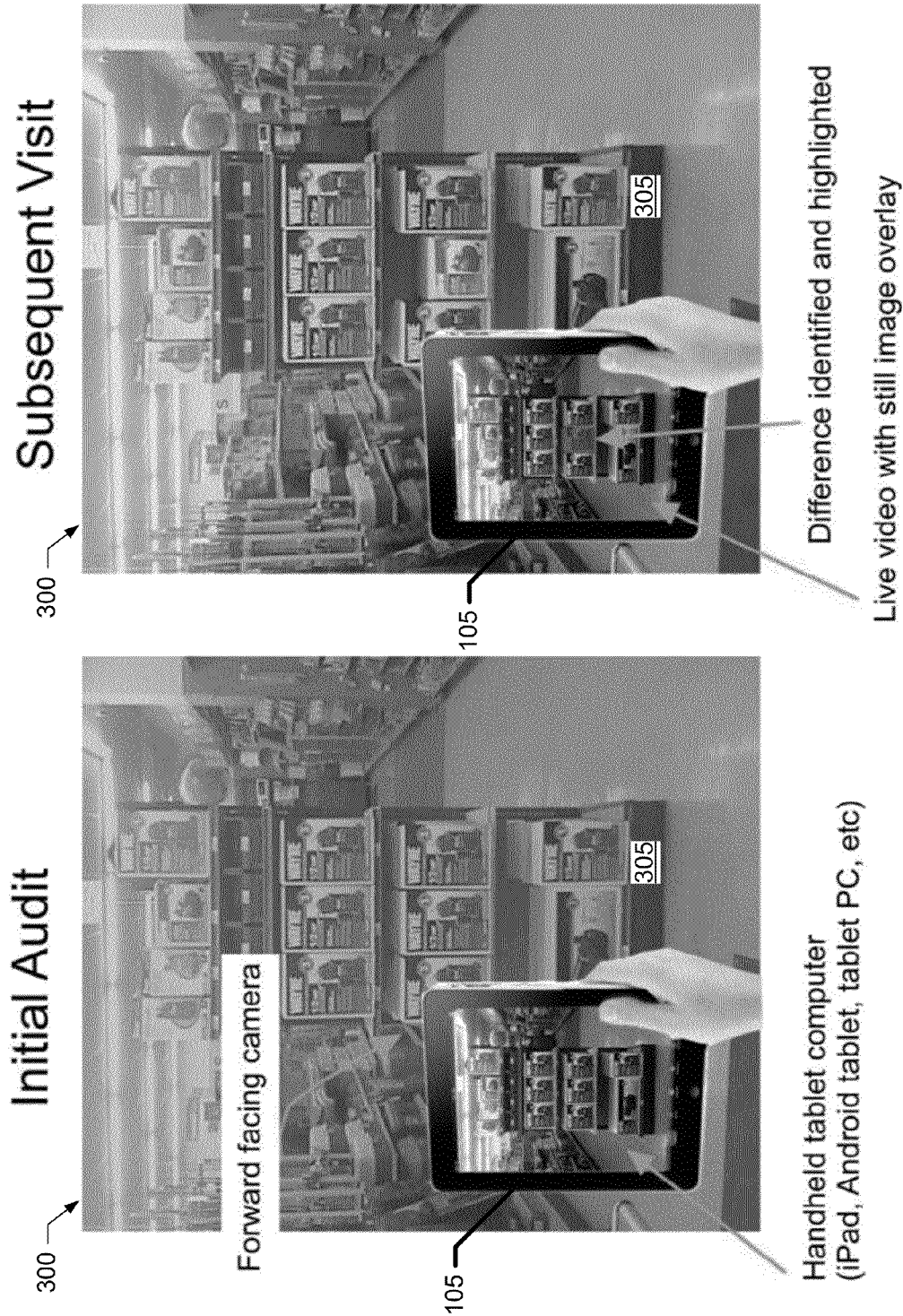
FIGS. 3A-B collectively illustrated an example operation of the example auditing device of FIG. 2.

Example operations of the auditing device 105 to perform image overlaying and comparison for inventory display auditing in an example retail store 300 is illustrated in FIGS. 3A-B. FIG. 3A depicts operation of the auditing device 105 during an initial audit of an example inventory display 305 in the retail store 300. During the initial audit, the auditing device 105 is used to capture a reference image representing the detail display, as shown. FIG. 3B depicts operation of the auditing device 105 during a subsequent audit of the inventory display 305 in the retail store 300. During the subsequent audit, the auditing device 105 overlays a semi-transparent, or ghost, version of the reference image obtained during the initial audit over the current image(s) (e.g., live video) being displayed on the auditing device 105. As described above, the auditing device 105 also determines and indicates (e.g., via highlighting in a different color, shade, etc.) a difference region corresponding to respective regions in the current and reference images that differ. The auditor's attention is drawn to the indicated difference region, prompting the user to focus auditing on the corresponding portion of the inventory display 305.

An example implementation of the scene positioner 225 included in the auditing device 105 of FIG. 2 is illustrated in FIG. 4. The example scene positioner 225 of FIG. 4 includes an example reference selector 405 to select a reference image from the reference storage 240 that corresponds to an inventory display to be audited. As described above, the reference storage 240 stores reference images obtained from prior (e.g., initial) audits of one or more inventory displays. In the illustrated example, the reference selector 405 selects a particular reference image from the reference storage 240 based on user input (e.g., obtained via the user interface 245).

The example scene positioner 225 of FIG. 4 also includes an example image overlayer 410 to overlay the reference image selected by the reference selector 405 on a current image captured by the camera 210 and displayed on the device display 220. In some examples, the image overlayer 410 overlays the reference image on a sequence of captured images obtained by the camera 210 (e.g., such as corresponding to real-time video feed from the camera 210) and displayed on the device display 220. Additionally or alternatively, the image overlayer 410 can overlay the reference image on any other image that is displayed on the device display 220.

In some examples, to overlay the reference image on a current image to be displayed on the device display 220, the image overlayer 410 determines a semi-transparent, or ghost, version of the reference image. For example, the image overlayer 410 can modify one or more image characteristics of the reference image, such as the reference image's average luminance and/or chrominance, the image's average brightness, the image's color map, etc., to generate the ghost version of the reference image. Additionally or alternatively, the image overlayer 410 can generate an outline version of the reference image using, for example, one or more edge detection techniques. The outline version of the reference image can be overlaid on the current image instead of, or in addition to, the ghost version of the reference image. The image overlayer 410 then combines (e.g., adds) the ghost and/or outline version(s) of the reference image with the current image to determine a combined image to be displayed on the device display 220. In some examples, the image overlayer 410 includes sufficient processing power to overlay the reference image on a sequence of current images corresponding to a video stream to be displayed on the device display 220.

The example scene positioner 225 of FIG. 4 further includes an example image correlator 415 to correlate the reference image selected by the reference selector 405 with the current (e.g., captured) image to be displayed on the device display 220. The image correlator 415 can perform any type of image correlation, such as pixel-by-pixel correlation, block correlation, etc., to compare the reference image and the current image. In some examples, the image correlator 415 determines a correlation value resulting from correlating the reference image and the current image, and compares the resulting correlation value to one or more thresholds. For example, the image correlator 415 can determine whether the reference image and the current image correspond to a same scene, such as the same inventory display to be audited, by comparing the resulting correlation value to a threshold. If the resulting correlation value meets and/or exceeds the threshold, the image correlator 415 determines that the reference image and the current image correspond to the same scene (e.g., the same inventory display). However, if the resulting correlation value does not meet or exceed the threshold, the image correlator 415 determines that the reference image and the current image do not correspond to the same scene. Furthermore, if the image correlator 415 determines that the reference image and the current image correspond to the same scene (e.g., the same inventory display), then the image correlator 415 can automatically select the current image to be representative of a current state of the scene (e.g., to be representative of the current state of the inventory display being audited). This current image selected by the image correlator 415 to be representative of a current state of the scene (e.g., inventory display) is also referred to herein as the representative captured image of the scene (e.g., inventory display) being audited.

In some examples, the scene positioner 225 of FIG. 4 additionally includes an example direction prompter 420 to determine one or more directional prompts to assist a user (e.g., the auditor 120) in positioning the auditing device 105 or, more specifically, the camera 210 such that a subsequent image captured by the camera 210 has an increased likelihood of being determined by the image correlator 415 to correspond to the same scene as the reference image selected by the reference selector 405. For example, if the image correlator 415 determines that the reference image and the current image do not correspond to the same scene (e.g., the same inventory display), then the direction prompter 420 can be invoked to determine a directional difference between the current image and the reference image. The direction prompter 420 can determine the directional difference by, for example, correlating (e.g., using the image correlator 415) the current image with shifted versions of the reference image, and/or vice versa, to determine a shift (e.g., specified by direction and/or amount) that increases (e.g., maximizes) the correlation between the current image and the reference image. In such an example, the direction prompter 420 then translates the shift into a positional movement of the camera 210 (and/or the auditing device 105) that would cause a subsequent image captured by the camera 210 to exhibit a similar shift relative to the reference image. In some examples, the direction prompter 420 causes the auditing device 105 to present one or more directional prompts representative of desired positional movement as helpful cue(s) to the auditor 120. Example of such directional prompts include, but are not limited to, one or more visual cues (such as one or more arrows, icons, etc.) displayed on the display device 220, one or more audible cues emitted by speaker(s) of the auditing device 105 (such as spoken directions, tones that change pitch and/or loudness as the auditing device 105 or, more specifically, the camera 210 is moved in the correct or incorrect direction relative to the desired positional movement, etc.), etc.

An example implementation of the scene comparator 230 included in the auditing device 105 of FIG. 2 is illustrated in FIG. 5. In some examples, the scene comparator 230 of FIG. 5 includes an example foreground determiner 505 to identify the foreground portions of images captured by the camera 210 of the auditing device 105. As noted above, the inventory display being audited (e.g., the inventory display 115A) will usually correspond to the foreground of the captured and reference images being processed by the auditing device 105. Focusing processing on the foreground portions of the images can improve comparison accuracy by disregarding unimportant differences in the background portions of these images. In examples in which the scene comparator 230 includes the foreground determiner 505, one or more of the reference images stored in the reference storage 240 may already include or otherwise be associated with descriptive information identifying the foregrounds of the stored reference images. To determine the foreground of the current captured image obtained from the camera 210 and determined to be representative of the current scene (e.g., inventory display) being audited (i.e., the representative captured image), the foreground determiner 505 compares a sequence of images captured before and/or after the current image to analyze the parallax exhibited among the images. Generally, the parallax exhibited by near-ground objects in successive captured images will differ from the parallax exhibited by far-ground objects. The foreground determiner 505 can use any appropriate technique to examine the parallax exhibited by different objects in the sequence of captured images before and/or after the representative captured image to segment the image into foreground portion(s) containing the near-ground object(s) and background portion(s) containing the background object(s).

In the description of the remaining elements of the scene comparator 230 of FIG. 5, it is assumed that, if the foreground determiner 505 is present in an example implementation, then the comparison processing performed by the remaining elements of the scene comparator 230 is limited to or, in other words, focused on the foreground portions of the current and reference images.

The example scene comparator 230 of FIG. 5 also includes an example image segmenter 510 to segment the current captured image obtained from the camera 210 and determined to be representative of the current scene (e.g., inventory display) being audited (i.e., the representative captured image). In some examples, the image segmenter 510 may also segment the reference image selected from the reference storage 240 as corresponding to the current scene. Additionally or alternatively, one or more of the reference images stored in the reference storage 240 may already include or otherwise be associated with descriptive information identifying the segments of the stored reference images. Any appropriate image segmentation technique may be used to segment the representative captured image into different segmented regions. In some examples, the image segmenter 510 tailors its image segmentation processing to segment the representative captured image into segmented region(s) corresponding to different items or groups of items in the current scene (e.g., inventory display) being audited. Additionally or alternatively, in some examples, the image segmenter 510 tailors its image segmentation processing to segment the representative captured image into segmented region(s) corresponding to different regions, such as different shelves, rows, columns, sections, etc., expected in the inventory display being audited.

The example scene comparator 230 of FIG. 5 further includes an example segment correlator 515 to correlate or otherwise compare segment regions(s) of the representative captured image and corresponding segment region(s) of the reference image selected as being representative of the scene (e.g., inventory display) being audited. Corresponding segment regions in the representative captured image and the reference image can be, for example, segment regions that are located in the same or similar area (e.g., within some tolerance) in the two images, and/or that have the same shape and/or orientation, etc. The segment correlator 515 can perform any type of image correlation, such as pixel-by-pixel correlation, block correlation, etc., to compare corresponding segment regions in the representative captured image and the reference image.

To identify segment regions that differ between the representative captured image and the reference image, the example scene comparator 230 of FIG. 5 includes an example difference identifier 520. The difference identifier 520 processes the segment correlation results obtained from the segment correlator 515 to determine one or more difference regions between the representative captured image and the reference image. A difference region corresponds to, for example, a segmented region of the representative captured image that differs from the corresponding segmented region of the reference image. For example, the difference identifier 520 can obtain a correlation result from the segment correlator 515 that was obtained by correlating a particular segmented region of the representative captured image with the corresponding segmented region of the reference image. The difference identifier 520 can then compare this correlation result with a threshold, with an average of the correlation results from correlating all or a subset of the segmented regions, etc., or any combination thereof. In such an example, if the correlation result for the particular segmented region of the representative captured image differs (e.g., exceeds) the threshold, average, etc., the difference identifier 520 identifies the particular segmented region as being a difference region between the representative captured image and the reference image.

Additionally, in some examples, the difference identifier 520 indicates the identified difference region(s) in the representative captured image as it is being displayed on the device display 220. For example, the difference identifier 520 can modify one or more image characteristics of the representative captured image in the location of the identified difference region(s) to visually indicate that these regions in the representative captured image is/are different from the corresponding region(s) in the reference image (and, thus, these region(s) of the inventory display being audited have likely changes since the prior/initial audit). Examples of image characteristics that can be modified by the difference identifier 520 to indicate the identified difference region(s) include, but are not limited to, the luminance and/or chrominance of the difference region(s), an average color in the difference region(s), and overlay of an outline and/or text in the identified difference region(s), etc., and/or any combination thereof.

An example implementation of the scene tracker 235 included in the auditing device 105 of FIG. 2 is illustrated in FIG. 6. The example scene tracker 235 of FIG. 6 includes an example segment tracker 605 to track identified difference segment(s) in a sequence of captured images obtained from the camera 210 following the representative captured image (i.e., the current image captured by the camera and determined to be representative of the scene, such as the inventory display, being audited). As described above, the scene comparator 230 determines the difference region(s) between the representative captured image and the reference image selected as being representative of the scene (e.g., inventory display) being audited. The scene comparator 230 also indicates the identified difference region(s) in a display of the representative captured image on the device display 220. In the illustrated example of FIG. 6, the segment tracker 605 performs correlation (e.g., in real-time) and/or any other appropriate image tracking technique to track the identified difference region(s) in the sequence of captured images obtained from the camera 210 following the representative captured image. For example, the identified difference region(s) may change location, orientation, etc., in subsequent captured images as the auditing device 105 or, more specifically, the camera 210 is moved during the auditing process. The segment tracker 605 employ real-time correlation and/or other appropriate tracking processing to track the changes (e.g., deltas) in the location, orientation, etc., of the identified difference region(s) in subsequent images captured by the camera 210.

The example scene tracker 235 of FIG. 6 also includes an example image augmenter 610 to augment the subsequent captured images obtained by the camera 210 and displayed on the device display 220 to indicate the identified difference region(s) in these subsequent captured images. As such, the image augmenter 610 can cause an augmented reality version of the scene (e.g., inventory display) being audited to be displayed on the device display 220 as the auditing device 105 or, more specifically, the camera 210 is moved during the auditing process. For example, the image augmenter 610 can modify one or more image characteristics of the subsequent captured images in the location of the difference region(s) as they are tracked by the segment tracker 605. Examples of image characteristics that can be modified by the image augmenter 610 to indicate the tracked difference region(s) include, but are not limited to, the luminance and/or chrominance of the difference region(s), an average color in the difference region(s), and overlay of an outline and/or text in the identified difference region(s), etc., and/or any combination thereof.

While an example manner of implementing the auditing device 105 of FIG. 1 has been illustrated in FIGS. 2-6, one or more of the elements, processes and/or devices illustrated in FIGS. 2-6 may be combined, divided, re-arranged, omitted, eliminated and/or implemented in any other way. Further, the example camera 210, the example image grabber 215, the example device display 220, the example scene positioner 225, the example scene comparator 230, the example scene tracker 235, the example data reporter 250, the example reference selector 405, the example image overlayer 410, the example image correlator 415, the example direction prompter 420, the example foreground determiner 505, the example image segmenter 510, the example segment correlator 515, the example difference identifier 520, the example segment tracker 605, the example image augmenter 610 and/or, more generally, the example auditing device 105 of FIGS. 1-6 may be implemented by hardware, software, firmware and/or any combination of hardware, software and/or firmware. Thus, for example, any of the example camera 210, the example image grabber 215, the example device display 220, the example scene positioner 225, the example scene comparator 230, the example scene tracker 235, the example data reporter 250, the example reference selector 405, the example image overlayer 410, the example image correlator 415, the example direction prompter 420, the example foreground determiner 505, the example image segmenter 510, the example segment correlator 515, the example difference identifier 520, the example segment tracker 605, the example image augmenter 610 and/or, more generally, the example auditing device 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example auditing device 105, the example camera 210, the example image grabber 215, the example device display 220, the example scene positioner 225, the example scene comparator 230, the example scene tracker 235, the example data reporter 250, the example reference selector 405, the example image overlayer 410, the example image correlator 415, the example direction prompter 420, the example foreground determiner 505, the example image segmenter 510, the example segment correlator 515, the example difference identifier 520, the example segment tracker 605 and/or the example image augmenter 610 are hereby expressly defined to include a tangible computer readable medium such as a memory, digital versatile disk (DVD), compact disk (CD), etc., storing such software and/or firmware. Further still, the example auditing device 105 may include one or more elements, processes and/or devices in addition to, or instead of, those illustrated in FIGS. 1-6, and/or may include more than one of any or all of the illustrated elements, processes and devices.

Flowcharts representative of example machine readable instructions that may be executed to implement the example auditing device 105, the example camera 210, the example image grabber 215, the example device display 220, the example scene positioner 225, the example scene comparator 230, the example scene tracker 235, the example data reporter 250, the example reference selector 405, the example image overlayer 410, the example image correlator 415, the example direction prompter 420, the example foreground determiner 505, the example image segmenter 510, the example segment correlator 515, the example difference identifier 520, the example segment tracker 605 and/or the example image augmenter 610 are shown in FIGS. 7-10. In these examples, the machine readable instructions represented by each flowchart may comprise one or more programs for execution by a processor, such as the processor 1112 shown in the example processing system 1100 discussed below in connection with FIG. 11. Alternatively, the entire program or programs and/or portions thereof implementing one or more of the processes represented by the flowcharts of FIGS. 7-10 could be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 7-10 may be implemented manually. Further, although the example machine readable instructions are described with reference to the flowcharts illustrated in FIGS. 7-10, many other techniques for implementing the example methods and apparatus described herein may alternatively be used. For example, with reference to the flowcharts illustrated in FIGS. 7-10, the order of execution of the blocks may be changed, and/or some of the blocks described may be changed, eliminated, combined and/or subdivided into multiple blocks.

As mentioned above, the example processes of FIGS. 7-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 7:
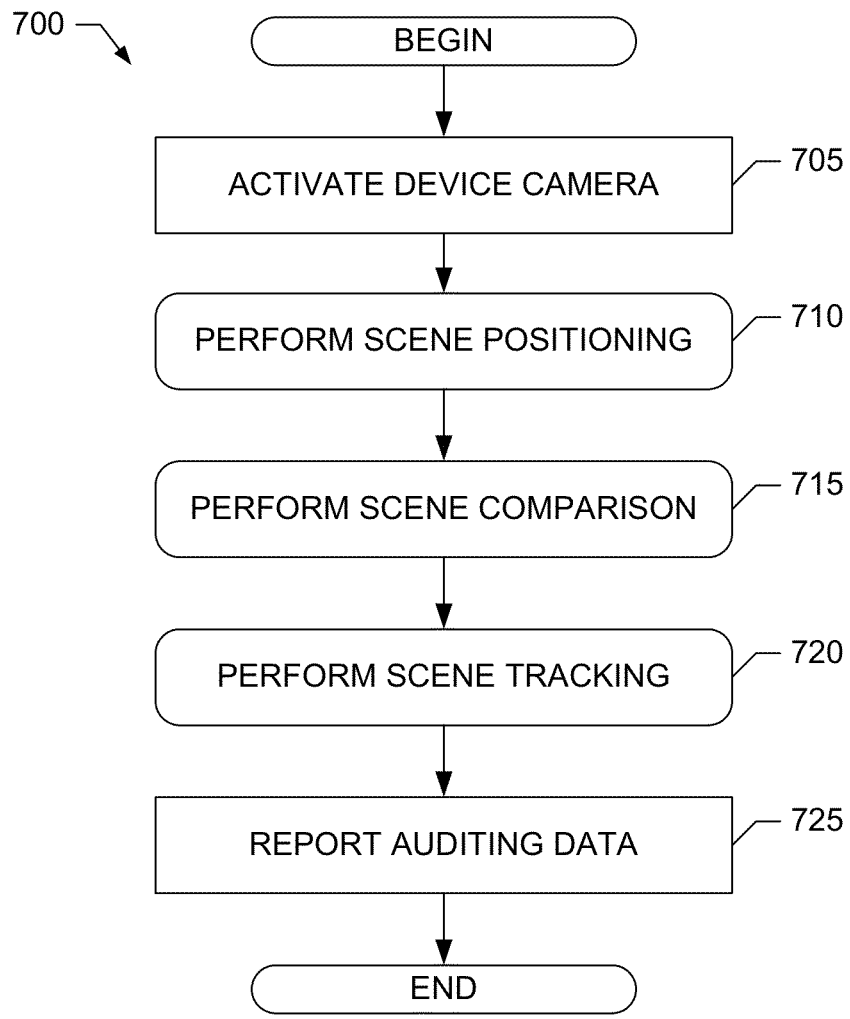
FIG. 7 is a flowchart representative of example machine readable instructions that may be executed to implement the example auditing device of FIG. 2.

Example machine readable instructions 700 that may be executed to implement the example auditing device 105 illustrated in FIGS. 1, 2 and/or 3A-B are represented by the flowchart shown in FIG. 7. With reference to the preceding figures, the machine readable instructions 700 of FIG. 7 begin execution at block 705 at which the auditing device 105 activates the camera 210. For example, the auditing device 105 can receive a command from the auditor 120 via the user interface 245 that is to cause the camera 210 to be activated.

Next, at block 710 the scene positioner 225 of the auditing device 105 performs scene positioning processing, as described above, to determine whether a current image captured by the camera 210 and a selected reference image (e.g., corresponding to a scene, such as an inventory display, being audited) correspond to the same scene. At block 710, if the scene positioner 225 determines that the current image captured by the camera 210 and the selected reference image correspond to the same scene, the scene positioner 225 selects (e.g., automatically or based on an input received via the user interface 245) the current image to be the representative captured image for the current scene (e.g., inventory display) being audited. In some examples, if at block 710 the scene positioner 225 determines that the current image captured by the camera 210 and the selected reference image do not correspond to the same scene, the scene positioner 225 determines and presents one or more directional prompts to aid the auditor 120 in positioning the auditing device 105 or, more specifically, the camera 210 to capture a subsequent image that does correspond to the same scene as the reference image. Example machine readable instructions that may be used to perform the processing at block 710 are illustrated in FIG. 8, which is described in greater detail below.

Figure 9:
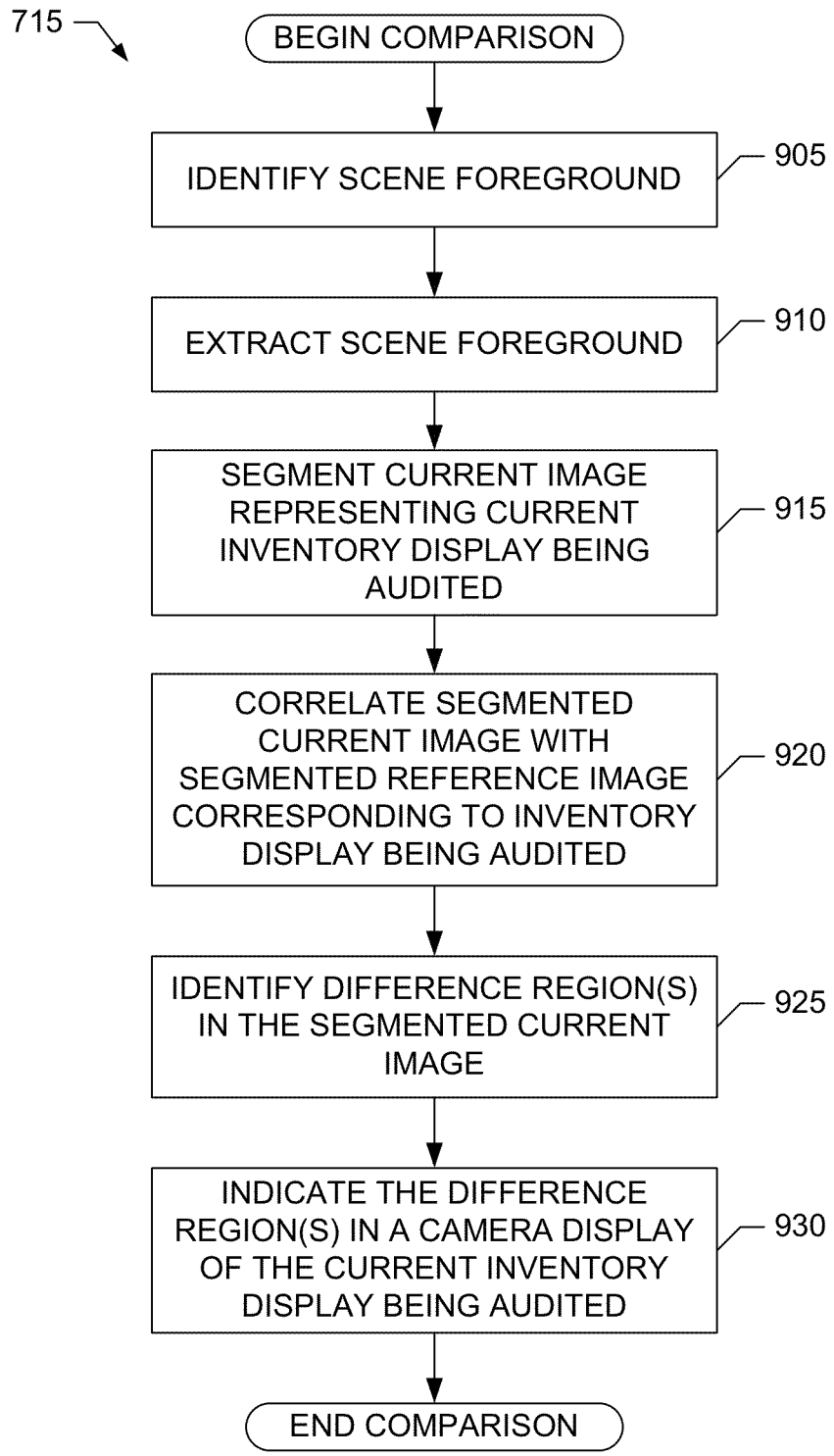
FIG. 9 is a flowchart representative of example machine readable instructions that may be executed to implement the example scene comparator of FIG. 5.

Assuming that the scene positioner 225 selects a representative captured image for the current scene (e.g., inventory display) at block 710, at block 715 the scene comparator 230 of the auditing device 105 performs scene comparison processing, as described above, to compare the representative captured image and the selected reference image to identify any difference region(s) between the two images. If no difference regions are identified, the scene comparator 230 can indicate (e.g., via the device display) that the representative captured image and the selected reference image match and, thus, auditing of the current scene (e.g., inventory display) can be skipped. However, if one or more difference regions are identified, the scene comparator 230 can indicate the identified difference region(s) in a display of the representative captured image on the device display 220. Example machine readable instructions that may be used to perform the processing at block 715 are illustrated in FIG. 9, which is described in greater detail below.

Figure 10:
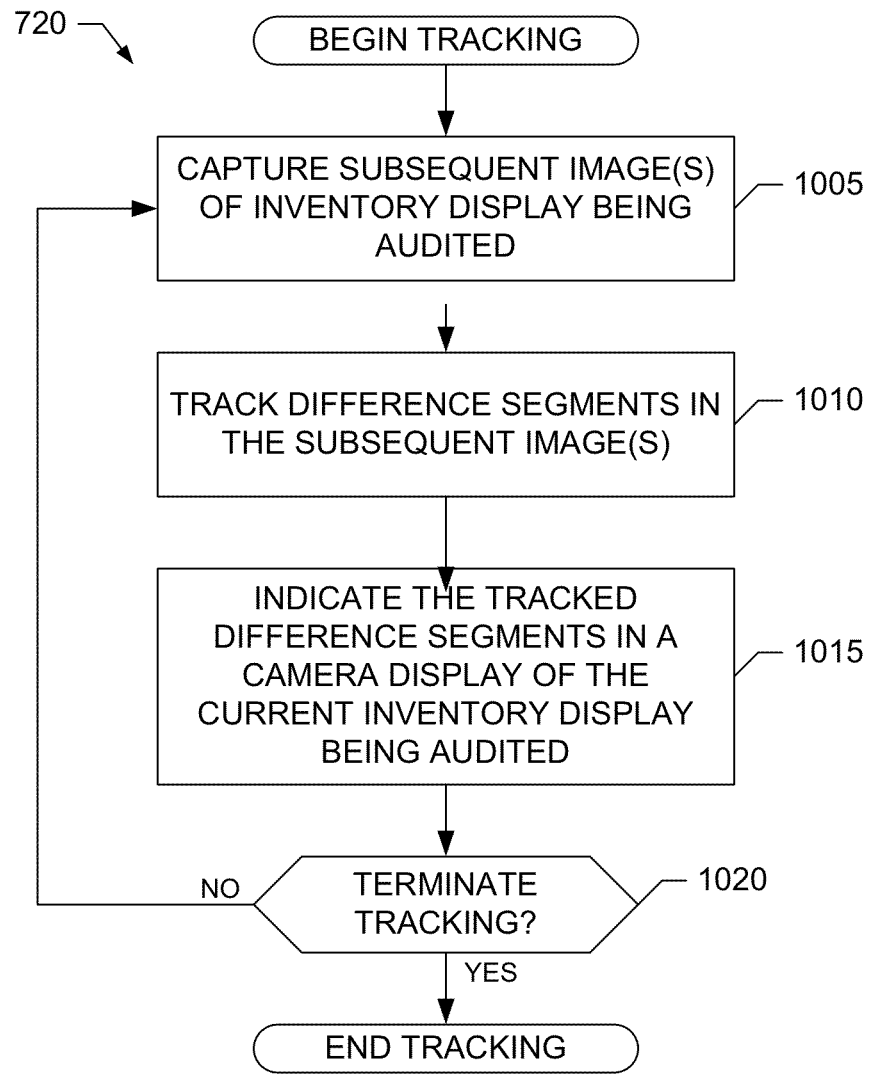
FIG. 10 is a flowchart representative of example machine readable instructions that may be executed to implement the example scene tracker of FIG. 6.

Assuming that the scene comparator 230 identifies one or more difference regions at block 715, at block 720 the scene tracker 235 of the auditing device 105 performs scene tracking processing, as described above, to track the identified difference region(s) in a sequence of subsequent images captured by the camera 210 after the representative captured image 720. Example machine readable instructions that may be used to perform the processing at block 720 are illustrated in FIG. 10, which is described in greater detail below. At block 725, the data reporter 250 of the example auditing device 105 reports the auditing data determined by the auditing device 105. The auditing data to be reported can include, for example, the captured image(s) determined by the auditing device 105 to represent one or more scenes (e.g., one or more inventory display(s)) audited during a store visit. Additionally or alternatively, the auditing data can include information entered by the auditor 120 via the user interface 245 specifying the type(s) of items included in the difference region(s), the orientation(s) of the items included in the difference region(s), etc. If no difference regions were identified at block 715, then the auditing data reported at block 725 can indicate that auditing was skipped for the particular scene (e.g., inventory display) because there were no identified differences relative to a prior (e.g., initial) audit corresponding to the reference image.

Figure 8:
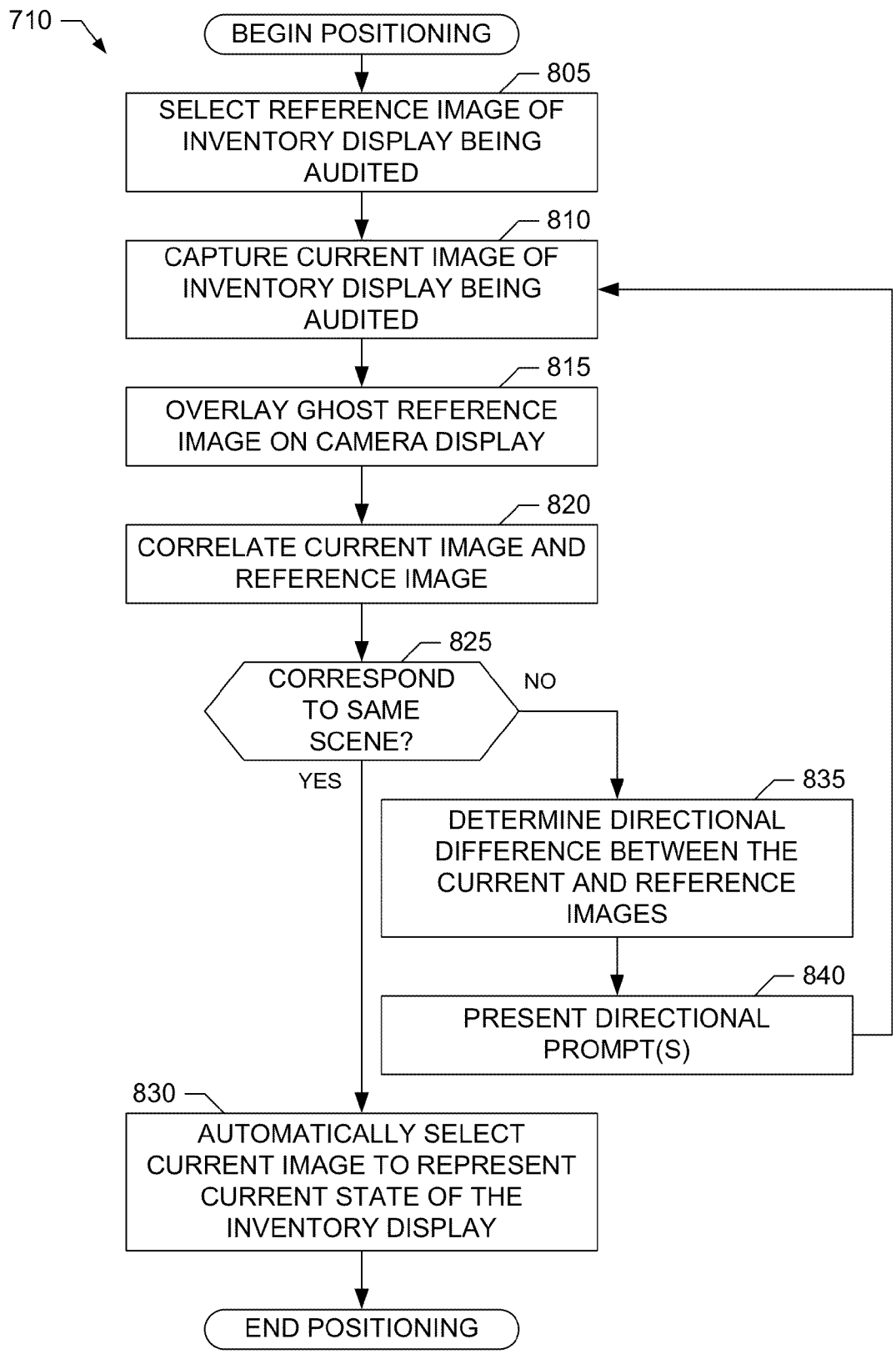
FIG. 8 is a flowchart representative of example machine readable instructions that may be executed to implement the example scene positioner of FIG. 4.

Example machine readable instructions 710 that may be executed to implement the example scene positioner 225 of FIGS. 2 and/or 4, and/or perform the processing at block 710 of FIG. 7, are represented by the flowchart shown in FIG. 8. With reference to the preceding figures, the machine readable instructions 710 of FIG. 8 begin execution at block 805 at which the reference selector 405 of the scene positioner 225 selects a reference image from the reference storage 240. For example, the reference selector 405 can select a reference image corresponding to a scene (e.g., inventory display) being audited based on user input received via the user interface 245 of the auditing device 105. At block 810, the camera 210 captures (e.g., via the image grabber 215) a current image of the scene (e.g., inventory display) being audited. At block 815, the image overlayer 410 overlays a semi-transparent, or ghost, version of the reference image on the current capture image displayed on the device display 220, as described above.

At block 820, the image correlator 415 of the scene positioner 225 correlates the current captured image and the reference image, as described above. At block 825, the image correlator 415 determines whether result of the correlation processing at block 820 indicates that the current captured image and the reference image correspond to the same scene, as described above. If the current captured image and the reference image are determined to correspond to the same scene, then at block 830 the image correlator 415 automatically selects the current captured image to be the representative captured image for the current scene (e.g., inventory display) being audited. In some examples, the scene positioner 225 can additionally or alternatively select the current captured image to be the representative captured image based on a user input received via the user interface 245.

However, if the captured image and the reference image are determined to not correspond to the same scene (block 825), then at block 835 the direction prompter 420 of the scene positioner 225 determines a directional difference between the current captured image and the reference image, as described above. At block 840, the direction prompter 420 causes one or more directional prompts to be presented by the auditing device 105, as described above, to aid the auditor 120 in positioning the auditing device 105 or, more specifically, the camera 210 such that a subsequent image captured by the camera 210 has an increased likelihood of being determined to correspond to the same scene as the reference image. Processing then returns to block 810 and blocks subsequent thereto to enable the scene positioner 225 to process a subsequent image captured by the camera 210.

Example machine readable instructions 715 that may be executed to implement the example scene comparator 230 of FIGS. 2 and/or 5, and/or perform the processing at block 715 of FIG. 7, are represented by the flowchart shown in FIG. 9. With reference to the preceding figures, the machine readable instructions 715 of FIG. 9 begin execution at blocks 905 and 910 at which the foreground determiner 505 of the scene comparator 230 identifies and extracts the scene foreground, as described above, from the representative captured image for the scene (e.g., inventory display) being audited. At block 915, the image segmenter 510 of the scene comparator 230 segments the representative captured image (and, in some examples, the reference image), as described above. At block 920, the segment correlator 515 of the scene comparator 230 correlates, as described above, the segmented regions of the representative captured image with the corresponding segmented regions of the reference image for the scene (e.g., inventory display) being audited. At blocks 925 and 930, the difference identifier 520 of the scene comparator 230 identifies any difference region(s) between the representative captured image and the reference image using the correlation results obtained from block 920, and indicates the identified difference region(s), if any, in the display of the representative captured image on the device display 220, as described above.

Example machine readable instructions 720 that may be executed to implement the example scene tracker 235 of FIGS. 2 and/or 6, and/or perform the processing at block 720 of FIG. 7, are represented by the flowchart shown in FIG. 10. With reference to the preceding figures, the machine readable instructions 720 of FIG. 10 begin execution at block 1005 at which the camera 210 captures a sequence of subsequent images following the representative captured image identified by the scene positioner 225 for the scene (e.g., inventory display) being audited. At block 1010, the segment tracker 605 of the scene tracker 235 tracks, as described above, any difference region(s) identified by the scene comparator 230 in the representative captured image for the scene (e.g., inventory display) being audited. At block 1015, the image augmenter 610 of the scene tracker 235 augments the display of the subsequent captured image(s) on the device display 220 to indicate the difference region(s) being tracked by the segment tracker 605.

At block 1020, the scene tracker 235 determines whether tracking of the difference region(s) is to be terminated. For example, a command may be received from the auditor 120 via the user interface 245 indicating that auditing of the scene (e.g., inventory display) is complete and, thus, tracking should be terminated (e.g., to permit auditing of a different scene, such as a different inventory display, to commence). If tracking is not to be terminated (block 1020), then processing returns to block 1005 and blocks subsequent thereto to enable the scene tracker 235 to continue tracking the difference region(s) in subsequent captured images. However, if tracking is not to be terminated (block 1020), the execution of the example machine readable instructions 720 ends.

Figure 11:
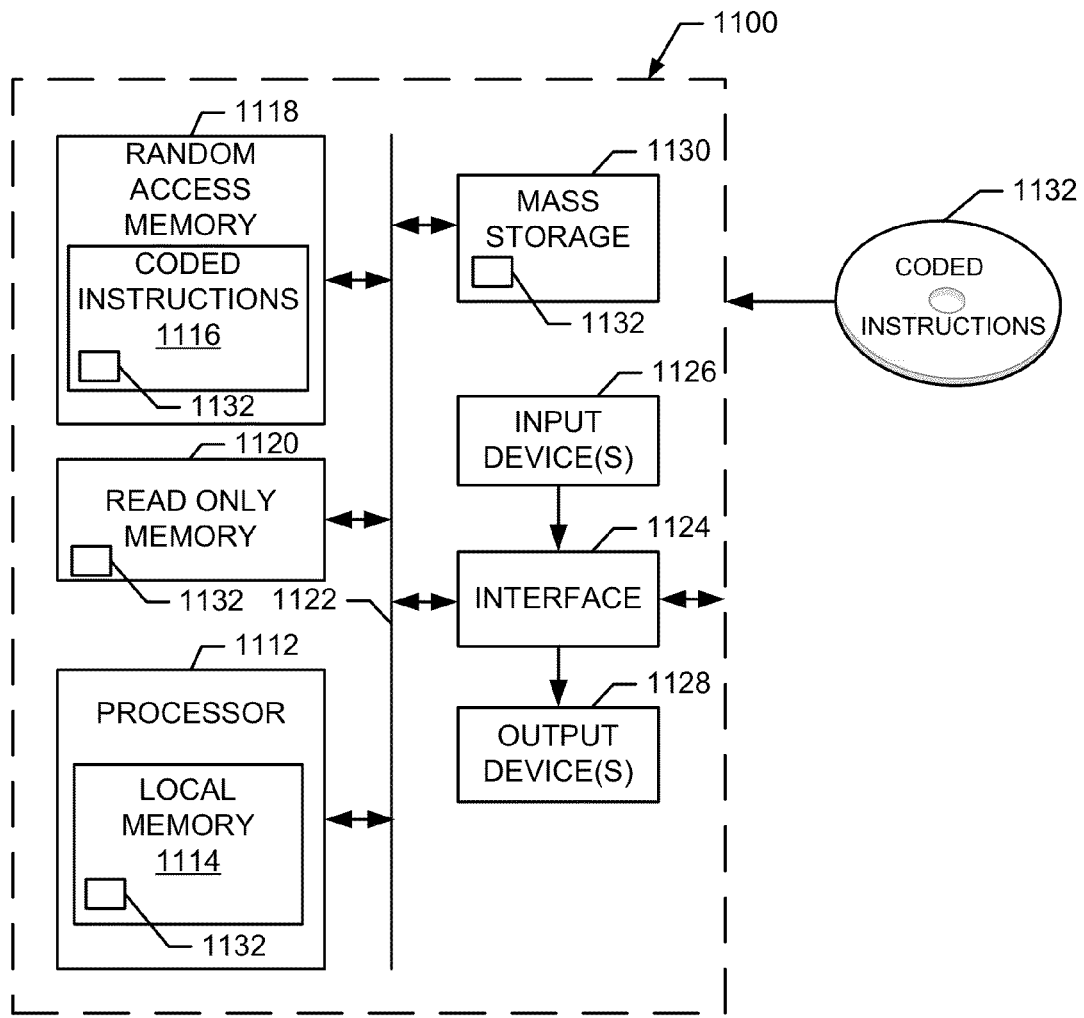
FIG. 11 is a block diagram of an example processing system that may execute the example machine readable instructions of FIGS. 7-9 and/or 10 to implement the example auditing device of FIG. 2, the example scene positioner of FIG. 4, the example scene comparator of FIG. 5 and/or the example scene tracker of FIG. 6.

FIG. 11 is a block diagram of an example processing system 1100 capable of implementing the apparatus and methods disclosed herein. The processing system 1100 can be, for example, a tablet computer, a smartphone, a personal digital assistant (PDA), a camera, a camcorder, a personal computer, a server, or any other type of computing device.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, the machine readable instructions represented in FIGS. 7-10. The processor 1112 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives.

The coded instructions 1132 of FIGS. 7-10 may be stored in the mass storage device 1130, in the volatile memory 1118, in the non-volatile memory 1120, in the local memory 1114 and/or on a removable storage medium, such as a CD or DVD 1132.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to perform inventory display auditing, the method comprising:

overlaying a reference image over a current image displayed on a camera display, the reference image corresponding to an inventory display to be audited;

comparing the reference image and the current image to determine whether the current image and the reference image correspond to a same scene; and when the reference image and the current image are determined to correspond to the same scene, modifying a characteristic of the current image in a difference region identified in the current image to display the difference region in an overlay of the reference image and the current image displayed on the camera display, the difference region being a first region of the current image that differs from a corresponding first region of the reference image.

2. A method as defined in claim 1 wherein overlaying the reference image comprises:

combining a ghost version of the reference image with the current image to determine a combined image; and displaying the combined image on the camera display.

3. A method as defined in claim 1 wherein comparing the reference image and the current image comprises correlating the reference image and the current image.

4. A method as defined in claim 3 wherein the reference image and the current image are determined to correspond to the same scene when a result of correlating the reference image and the current image satisfies a threshold.

5. A method as defined in claim 1 further comprising, when the reference image and the current image are determined to correspond to the same scene, comparing segmented regions of the current image and segmented regions of the reference image to determine the difference region.

6. A method as defined in claim 1 wherein the current image is a first captured image obtained from a camera corresponding to the camera display, and further comprising, when the reference image and the current image are determined to not correspond to the same scene:

determining a directional difference between the first captured image and the reference image; and presenting a directional prompt on the camera display, the directional prompt to indicate a direction in which to move the camera to increase a likelihood that a second captured image and the reference image will be determined to correspond to the same scene.

7. A method as defined in claim 1 wherein the current image is a first captured image obtained from a camera corresponding to the camera display, and further comprising tracking the difference region in subsequent captured images obtained from the camera.

8. A tangible computer readable medium comprising machine readable instructions which, when executed, cause a computing device to at least:

overlay a reference image over a first captured image displayed on an imaging display, the reference image corresponding to an inventory display to be audited, the reference image taken before the first captured image;

compare the reference image and the first captured image to determine whether the first captured image and the reference image correspond to a same scene;

when the reference image and the first captured image are determined to correspond to the same scene, indicate a difference region in the first captured image, the difference region being a first region of the first captured image that differs from a corresponding first region of the reference image; and when the reference image and the first captured image are determined to not correspond to the same scene:
determine a directional difference between the first captured image and the reference image; and
present a directional prompt on the imaging display, the directional prompt to indicate a direction in which to move the computing device to increase a likelihood that a second captured image and the reference image will be determined to correspond to the same scene.

9. A tangible computer readable medium as defined in claim 8 wherein the machine readable instructions, when executed, further cause the computing device to:
combine a ghost version of the reference image with the first captured image to determine a combined image; and
display the combined image on the imaging display.

10. A tangible computer readable medium as defined in claim 8 wherein the machine readable instructions, when executed, further cause the computing device to correlate the reference image and the first captured image to compare the reference image and the first captured image.

11. A tangible computer readable medium as defined in claim 10 wherein the reference image and the first captured image are determined to correspond to the same scene when a result of correlating the reference image and the first captured image satisfies a threshold.

12. A tangible computer readable medium as defined in claim 8 wherein the machine readable instructions, when executed, further cause the computing device to:
modify an image characteristic of the first region of the first captured image to determine a modified captured image; and
display the modified captured image.

13. A tangible computer readable medium as defined in claim 8 wherein the machine readable instructions, when executed, cause the computing device to compare segmented regions of the first captured image and segmented regions of the reference image to determine the difference region.

14. A tangible computer readable medium as defined in claim 8 wherein the machine readable instructions, when executed, further cause the computing device to track the difference region in subsequent captured images obtained from the computing device.

15. A method as defined in claim 1 wherein modifying the characteristic of the current image in the difference region comprises modifying at least one of a luminance or a chrominance of the current image in the difference region.

16. A method as defined in claim 5 further comprising:
determining an average value of correlation results obtained by correlating respective ones of the segmented regions of the current image with corresponding ones of the segmented regions of the reference image, the correlation results including a first correlation result obtained by correlating the first region of the current image with the corresponding first region of the reference image; and comparing the first correlation result with the average value to identify the difference region in the current image.

17. A tangible computer readable medium as defined in claim 8 wherein the machine readable instructions, when executed, further cause the computing device to correlate the first captured image with shifted versions of the reference image to determine the directional difference between the first captured image and the reference image.

18. A tangible computer readable medium as defined in claim 17 wherein the machine readable instructions, when executed, further cause the computing device to:
determine the directional difference to correspond to a first positional shift of the reference image that increases a correlation between the first captured image and the reference image; and
translate the first positional shift into a positional movement of the computing device that would cause the second captured image and the reference image to exhibit the first positional shift, the directional prompt presented on the imaging display being representative of the positional movement.

19. An apparatus comprising:
a device display;
a positioner to:
overlay a reference image over a first captured image displayed on the device display, the reference image corresponding to an inventory display to be audited; and
compare the reference image and the first captured image to determine whether the first captured image and the reference image correspond to a same scene; and
a comparator to, in response to the reference image and the first captured image being determined by the positioner to correspond to the same scene, modify a characteristic of the first captured image in a difference region identified in the first captured image to display the difference region in an overlay of the reference image and the first captured image displayed on the device display, the difference region being a first region of the first captured image that differs from a corresponding first region of the reference image.

20. An apparatus as defined in claim 19 wherein the comparator is further to, in response to the reference image and the first captured image being determined by the positioner to not correspond to the same scene:
determine a directional difference between the first captured image and the reference image; and
present a directional prompt on the imaging display, the directional prompt to indicate a direction in which to move the apparatus to increase a likelihood that a second captured image and the reference image will be determined to correspond to the same scene.

* * * * *